(12) United States Patent
Locker et al.

(10) Patent No.: US 7,705,837 B2
(45) Date of Patent: Apr. 27, 2010

(54) SYSTEM AND METHOD FOR ALARMING FOR MISPLACED COMPUTER TABLET PEN

(75) Inventors: Howard Jeffrey Locker, Cary, NC (US); Daryl Carvis Cromer, Cary, NC (US); Robert Jacob Herman, Cary, NC (US); Thomas R. Hildner, Austin, TX (US); Jeffrey Michael Samitt, Richmond, VA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 840 days.

(21) Appl. No.: 11/514,774

(22) Filed: Sep. 1, 2006

(65) Prior Publication Data

US 2008/0055278 A1    Mar. 6, 2008

(51) Int. Cl.
*G06F 3/033* (2006.01)
(52) U.S. Cl. .................... 345/179; 345/173; 345/174; 345/175; 345/176; 345/177; 178/18.01; 178/18.03; 178/18.05; 178/18.06; 178/18.07; 178/19.01; 178/19.02; 178/19.03; 178/19.04; 178/19.05

(58) Field of Classification Search ......... 345/173–179; 178/18.01–18.07, 19.01–19.07
See application file for complete search history.

(56) References Cited

U.S. PATENT DOCUMENTS

| 6,114,958 | A  | * | 9/2000 | Murphy .................. 340/568.1 |
| 2007/0063994 | A1 | * | 3/2007 | Carlson et al. .............. 345/179 |

* cited by examiner

*Primary Examiner*—Richard Hjerpe
*Assistant Examiner*—Saifeldin Elnafia
(74) *Attorney, Agent, or Firm*—John L. Rogitz

(57) ABSTRACT

A computer tablet includes a wireless receiver, and a pen is configured to be manipulated by a person to ride against the computer tablet and thereby provide input to the computer tablet. The pen includes a wireless transmitter. A processor associated with the computer tablet outputs an alarm when a signal from the transmitter of the pen is not sensed by the computer tablet within a time period.

16 Claims, 1 Drawing Sheet

SYSTEM AND METHOD FOR ALARMING FOR MISPLACED COMPUTER TABLET PEN

FIELD OF THE INVENTION

The present invention relates generally to systems and methods for indicating misplaced computer tablet pens.

BACKGROUND OF THE INVENTION

The onset of hand-writing recognition software in devices such as laptops has seen a significant advance in technology, but this new technology also comes logistical concerns that need to be addressed. Every device that has the capability of handwriting recognition must also include hardware to be used to electronically communicate the data. This data is then interpreted by the processor of the computer. After a user is done transcribing data to the device using an electronic writing tablet and compatible electronic pen, it is understandable that human error can result in the separation of the pen from the computer tablet itself, which is typically part of a larger device such as a laptop. Many times the electronic pens are forgotten or lost. However, the cost of electronic pens can be significantly high and they cannot be easily and readily replaced. Without the compatible electronic pen, the tablet becomes unusable. The same considerations apply to pens used as pointing devices.

To address the above concerns, one method for ensuring that the electronic pen and writing tablet remain in close vicinity to each other so as to not lose or misplace the electronic pen includes fastening both objects to opposite ends of a cord so that it is not possible to separate the two. This can also create the inconvenience of having the cord obstruct a clear writing path on the tablet for the user and can be difficult to manage.

SUMMARY OF THE INVENTION

A system is disclosed that includes a computer tablet including a wireless receiver, and a pen configured to be manipulated by a person to ride against or pass near the computer tablet and thereby provide input to the computer tablet. The pen includes a wireless transmitter. A processor is associated with the computer tablet and outputs an alarm when at least one signal from the transmitter of the pen is not sensed by the computer tablet within a time period.

In non-limiting embodiments the receiver and transmitter use short range RF such as Bluetooth, Ultra Wide Band (UWB), and radiofrequency identifier (RFID). The alarm may be audible or it may be a visible message presented on the computer tablet.

In some implementations the pen periodically transmits a wireless signal using the transmitter to the receiver of the tablet, and if the tablet does not receive the signal within an expected period, the alarm is generated. In other implementations the tablet polls the pen for a wireless response, and if a response is not received within an expected period, the alarm is generated.

In another aspect, a method includes determining if a wireless presence signal has been sensed from a pen by a computerized tablet, and generating an alarm in the absence of the wireless presence signal.

In yet another aspect, a pen and a computerized writing tablet past which the pen can be manipulated are disclosed to generate handwriting signals. The tablet converts the writing signals to data in a computer file. Means are provided for transmitting a wireless presence signal from the pen to the tablet, and means alarm in the absence of the wireless presence signal.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
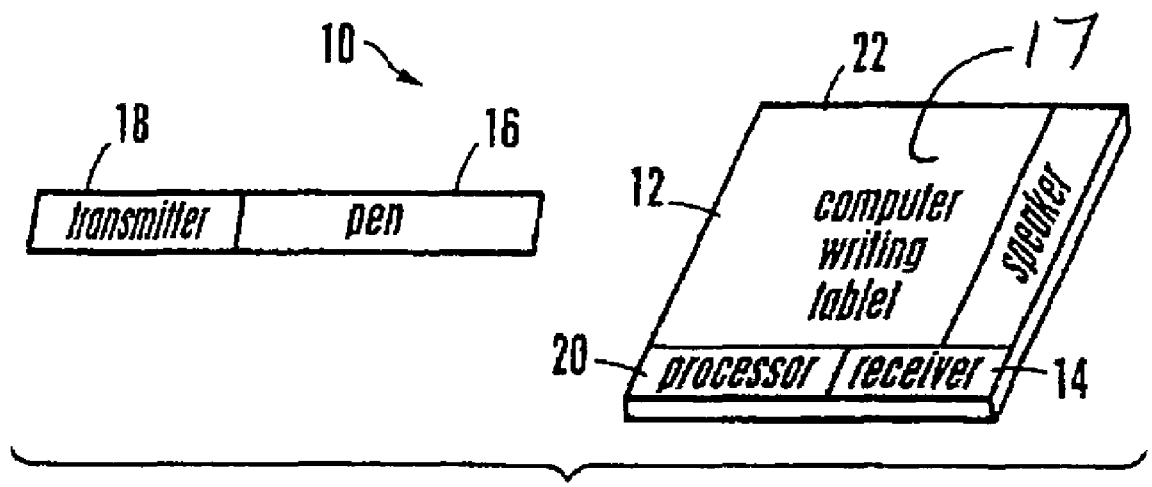
FIG. 1 is a block diagram of a non-limiting system in accordance with the present invention.

Beginning initially with FIG. 1, a non-limiting embodiment for the computer tablet system 10 is shown. The system 10 includes a computer tablet 12 and a receiver 14. The computer tablet 12 receives data input from a user by way of a pen 16. The pen 16 is configured to be manipulated by a user to ride against or pass near an input surface 17 of the computer tablet (which can also function as a display), providing input to the computer tablet 12, which uses handwriting recognition principles known in the art to convert movement of the pen into a computer text file or other file. In addition or in lieu of handwriting input, the pen may be used as a pointing device.

The pen 16 also has a wireless transmitter 18 which is used to communicate with the receiver 14 in accordance with principles disclosed below. The transmitter 18 may be a transceiver to detect the below-described polling signal from the tablet, or a separate receiver in the pen 16 may be provided.

The receiver 14 and the wireless transmitter 18 communicate to determine whether the computer tablet system 10 and the pen 16 are in the same locale, or if the two objects might have been separated. This communication is performed by sending wireless, short range radio frequency signals from one of the objects to the other. This communication (or its absence) is used to determine whether the user should receive an alarm that the tablet 12 and pen 16 have been separated. It is to be understood that in one non-limiting embodiment, the receiver 14 and transmitter 18 can both use a short range radio frequency transmission method such as, e.g., Bluetooth technology, UWB, or RFID.

The computer tablet 12 includes a processor 20, used to interpret data input from the user. The processor 20 has the ability to output an alarm when at least one signal from the transmitter 18 is not sensed by the receiver 14 within a designated time period.

The computer tablet 12 can also include plural speakers 22 which can be used to audibly notify the user if the pen 16 has been separated from the tablet 12. In addition or instead, a visible alarm message can be presented on the surface 17 of the tablet 12. Thus, when an alarm has been initiated, it can be communicated to the user in one or plural ways, either an audible alarm using the speakers 22 and/or a visible message presented to the user somewhere on the computer tablet system 10, e.g., on the surface 17.

Figure 2:
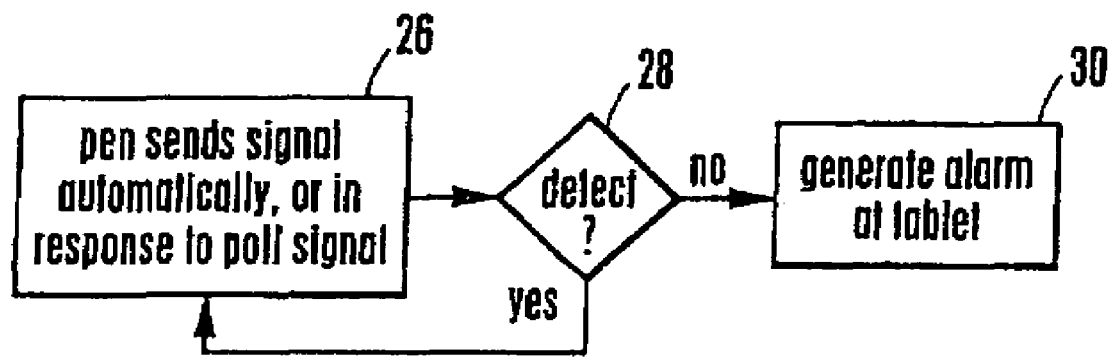
FIG. 2 is a flow chart of non-limiting logic envisioned by the present invention.

Now referring to FIG. 2, the logic for detecting whether the computer tablet 12 and the pen 16 are in the same locale is shown. Beginning at block 26, the pen 16 and tablet 12 can communicate in one of two methods. In the first method, the pen 16 periodically and automatically, without prompt, sends a wireless presence signal to the receiver 14 in an expected period of time. In the second method, the pen 16 sends a wireless presence signal in response to a poll signal initiated by the receiver 14.

In either case, moving to decision diamond 28, the processor 20 determines if the appropriate wireless presence signals from the pen have been detected within the expected time period. As a non-limiting example, the pen may be expected to send a presence signal every few milliseconds, and if the signal is not received within ten seconds (more generally, any time period greater than the period between presence signal pulses but short enough that the user cannot transport the tablet very far from the pen), an alarm is activated as discussed below. The presence signal from the pen cannot be detected by the tablet when the two components are separated from each other by more than the relatively short range of the wireless technology being used, and the distance beyond which the pen signal can no longer be detected by the tablet can be "tuned" even further by limiting the power of the transmitter 18.

If the tablet receives a signal from the pen within the expected time period, the logic reverts back to block 26 and begins again. In contrast, if the logic determines that a wireless signal has not been detected within the expected period, the logic moves to block 30 wherein an alarm is generated to notify the user of the separation of the two objects. The alarm can be generated under two circumstances. Should the first method of communication be implemented and the receiver 14 receives no wireless signal from the pen 16 during the expected time period, an alarm is generated. Using the second method, if the receiver 14 polls the pen 16 and no response is received by the pen 16 within, say, a few milliseconds after polling, an alarm is generated.

While the particular SYSTEM AND METHOD FOR ALARMING FOR MISPLACED COMPUTER TABLET PEN is herein shown and described in detail, it is to be understood that the subject matter which is encompassed by the present invention is limited only by the claims.

What is claimed is:

1. A system, comprising:
   a computer tablet including a wireless receiver;
   a pen configured to be manipulated by a person past the computer tablet and thereby provide input to the computer tablet, the pen including a wireless transmitter; and
   a processor associated with the computer tablet and outputting an alarm when at least one wireless presence signal from the transmitter of the pen is not sensed by the computer tablet within a time period, wherein the pen periodically transmits the wireless presence signal using the transmitter to the receiver of the tablet, and if the tablet does not receive the presence signal within an expected period, the alarm is generated, wherein the pen sends wireless presence signals spaced in time from each other by a transmission period, and the alarm is generated only if a presence signal is not received within the expected period, the expected period being a time period greater than the transmission period.

2. The system of claim 1, wherein the receiver and transmitter use short range radiofrequency technology.

3. The system of claim 2, wherein the receiver and transmitter use Bluetooth, or Ultra Wide Band (UWB), or radiofrequency identifier (RFID) technology.

4. The system of claim 1, wherein the alarm is audible.

5. The system of claim 1, wherein the alarm is a visible message presented on the computer tablet.

6. A method comprising:
   determining if a wireless presence signal has been sensed from a pen by a computerized tablet; and
   generating an alarm in the absence of the wireless presence signal, wherein the tablet polls the pen for a wireless presence signal, and if a wireless presence signal is not received within an expected period after polling, the alarm is generated.

7. The method of claim 6, wherein the wireless presence signal is a short range RF.

8. The method of claim 7, wherein the wireless presence signal is a Bluetooth signal or an Ultra Wide Band (UWB) signal or a radiofrequency identifier (RFID) signal.

9. The method of claim 6, wherein the alarm is audible.

10. The method of claim 6, wherein the alarm is a visible message presented on the computer tablet.

11. A system comprising:
    a pen;
    a computerized writing tablet past which the pen can be manipulated to generate handwriting signals and/or pointing device inputs, the tablet converting the writing signals to data in a computer file and/or translating the pointing device inputs;
    means for transmitting a wireless presence signal from the pen to the tablet; and
    means for alarming in the absence of the wireless presence signal, wherein the wireless presence signal is an Ultra Wide Band (UWB) signal or a radiofrequency identifier (RFID) signal.

12. The system of claim 11, wherein the wireless presence signal is a short range RF signal.

13. The system of claim 11, wherein the means for alarming is a speaker.

14. The system of claim 11, wherein the means for alarming is a display of computer tablet.

15. The system of claim 11, wherein the pen periodically transmits the wireless presence signal without prompt from the tablet.

16. The system of claim 11, wherein the tablet polls the pen for the wireless presence signal.

\* \* \* \* \*